(12) United States Patent
Wang et al.

(10) Patent No.: US 11,688,091 B2
(45) Date of Patent: Jun. 27, 2023

(54) REAL-TIME RANGING METHOD OF COMMON-VIRTUAL-AXIS THREE-DIMENSIONAL CAMERA BASED ON YOLOV3-TINY

(71) Applicant: Zhuhai Timeline Technology Co., Ltd., Lanzhou (CN)

(72) Inventors: Peng Wang, Lanzhou (CN); Jitong Xin, Lanzhou (CN); Fangcong Wang, Lanzhou (CN); Luojia Shi, Lanzhou (CN)

(73) Assignee: ZHUHAI TIMELINE TECHNOLOGY CO., LTD., Lanzhou (CN)

( * ) Notice: Subject to any disclaimer, the term of this patent is extended or adjusted under 35 U.S.C. 154(b) by 1 day.

(21) Appl. No.: 17/650,603

(22) Filed: Feb. 10, 2022

(65) Prior Publication Data

US 2023/0114915 A1    Apr. 13, 2023

(30) Foreign Application Priority Data

Oct. 8, 2021    (CN) .......................... 202111174541.2

(51) Int. Cl.
*G06T 7/593*    (2017.01)
*G06V 10/44*    (2022.01)
(Continued)

(52) U.S. Cl.
CPC ................ *G06T 7/593* (2017.01); *G01C 3/08* (2013.01); *G06T 1/60* (2013.01); *G06T 7/30* (2017.01); *G06T 7/74* (2017.01); *G06V 10/16* (2022.01); *G06V 10/44* (2022.01); *G06V 10/82* (2022.01); *H04N 13/156* (2018.05); *H04N 13/207* (2018.05); *G06T 2200/28* (2013.01);
(Continued)

(58) Field of Classification Search
USPC ........................................................... 348/46
See application file for complete search history.

(56) References Cited

U.S. PATENT DOCUMENTS

2021/0304438 A1*    9/2021   Ye .............................. G06T 7/75

FOREIGN PATENT DOCUMENTS

| WO | WO-2021085453 A1 * | 5/2021 | ............... G06T 7/55 |
| WO | WO-2021237608 A1 * | 12/2021 | ............... G06K 9/00 |

* cited by examiner

*Primary Examiner* — Behrooz M Senfi
(74) *Attorney, Agent, or Firm* — M&B IP Analysts, LLC

(57) ABSTRACT

The present disclosure discloses a real-time ranging method of a common-virtual-axis three-dimensional (3D) camera based on YOLOv3-tiny, including: acquiring, by the common-virtual-axis 3D camera, a far image and a near image on a same optical axis; processing image data of the near image and image data of the far image by using a YOLOv3-tiny target-recognition neural-network acceleration algorithm; determining, according to the processed image data, two target recognition frames corresponding to a preset recognized object on the far image and the near image; performing curvature scale space (CSS) corner recognition on image data in the target recognition frames; obtaining an average value of distances from far and near corners to a center point of the image data in each of the target recognition frames according to recognized corner coordinates; and substituting the obtained average value into an optical relation of the common-virtual-axis 3D camera, to obtain distance information.

8 Claims, 2 Drawing Sheets

(51) Int. Cl.
  *G06T 7/73* (2017.01)
  *G06V 10/10* (2022.01)
  *G06T 1/60* (2006.01)
  *H04N 13/207* (2018.01)
  *H04N 13/156* (2018.01)
  *G06T 7/30* (2017.01)
  *G01C 3/08* (2006.01)
  *G06V 10/82* (2022.01)

(52) U.S. Cl.
  CPC ............ *G06T 2207/10012* (2013.01); *G06T 2207/10028* (2013.01); *G06T 2207/20081* (2013.01); *G06T 2207/20084* (2013.01); *G06T 2207/20212* (2013.01); *G06V 2201/07* (2022.01)

REAL-TIME RANGING METHOD OF COMMON-VIRTUAL-AXIS THREE-DIMENSIONAL CAMERA BASED ON YOLOV3-TINY

CROSS REFERENCE TO RELATED APPLICATION(S)

This patent application claims the benefit and priority of Chinese Patent Application No. 202111174541.2, filed on Oct. 8, 2021, the disclosure of which is incorporated by reference herein in its entirety as part of the present application.

TECHNICAL FIELD

The present disclosure relates to a real-time ranging method of a common-virtual-axis three-dimensional (3D) camera based on a YOLOv3-tiny algorithm (a lightweight algorithm for recognizing and positioning an object based on a deep neural network).

BACKGROUND ART

Camera ranging has a wide range of application prospects. For example, unmanned driving, unmanned aerial vehicles, and the like all require cameras to perform preliminary ranging. The camera ranging also has great application prospects in the field of industrial measurement and blasting. YOLOv3-tiny, which is an algorithm for recognizing and positioning an object based on a deep neural network, is specifically characterized by a quite fast operation speed, and can be used for real-time systems. How to combine the YOLOv3-tiny algorithm with a common-virtual-axis 3D camera to realize real-time ranging is the research direction of those skilled in the art.

SUMMARY

An objective of the present disclosure is to provide a real-time ranging method of a common-virtual-axis 3D camera based on YOLOv3-tiny, to accurately measure the distance in real time.

The technical solutions for achieving the foregoing objective are as follows:

A real-time ranging method of a common-virtual-axis 3D camera based on YOLOv3-tiny includes:

step S1: acquiring, by the common-virtual-axis 3D camera, a far image and a near image on a same optical axis;

step S2: processing image data of the near image and image data of the far image by using a YOLOv3-tiny target-recognition neural-network acceleration algorithm;

step S3: determining, according to the processed image data, two target recognition frames corresponding to a preset recognized object on the far image and the near image;

step S4: performing curvature scale space (CSS) corner recognition on image data in the target recognition frames;

step S5: obtaining an average value of distances from far and near corners to a center point of the image data in each of the target recognition frames according to recognized corner coordinates; and step S6: substituting the obtained average value into an optical relation of the common-virtual-axis 3D camera, to obtain distance information.

Preferably, in step S2, YOLOv3-tiny target-recognition neural-network weight data is first obtained, core processing is accelerated on field programmable gate arrays (FPAGs) according to the YOLOv3-tiny target-recognition neural-network weight data and an algorithm structure, and then the image data of the far image and the image data of the near image in the same frame are registered, while a stitching operation is performed.

Preferably, in step S3, pieces of position information of the center points in the two target recognition frames overlap in the far image and the near image.

Preferably, a one-to-one correspondence between the corners recognized in the two target recognition frames is established.

Preferably, the optical relation of the common-virtual-axis 3D camera is:

$$L'1 = \frac{(L2 - L1 + h)}{1 - \frac{d1}{d2}},$$

where the near image is shot from L1, and the far image is shot from L2; L1 is a distance between a center of a 50% mirror and an upper lens, and L2 is a distance between a center of the total mirror and a lower lens; an average value of corners in a target recognition frame in a first lens is d1, and an average value of corners in a target recognition frame in a second lens is d2; a distance between an optical axis of the first lens and an optical axis of the second lens is h; and a distance between the object and the first lens is L'1.

Preferably, step S2 includes:

buffering the image data by using three linebuffers (linebuffers of the field programmable gate array (FPGA) image processing) and packing the image data;

performing first-level operations:

performing a convolution operation and a rectified linear unit (ReLU) operation on the packed image data to obtain a first result;

performing max pooling (the maximum pooling operation in the CNN) on the first result to obtain a second result;

obtaining YOLOv3-tiny target-recognition neural-network weight data; and storing the second result and the obtained YOLOv3-tiny target-recognition neural-network weight data;

repeating the following operations a plurality of times:

obtaining the second result, the YOLOv3-tiny target-recognition neural-network weight data, and pre-stored bias data that are of the previous-level operations, replacing the packed image data in the first-level operations, and executing the first-level operations; and outputting the processed image data:

using the second result, obtained in the predetermined two-level operations, as the image data processed in step S3, and outputting the image data.

Preferably, the convolution operation is performed by using a fixed-point matrix multiplication unit including 16 processing elements (PE) units.

After multiplying the YOLOv3-tiny target-recognition neural-network weight data with the image data, the PE units add the multiplication result with bias data and shift them to output a final result.

Preferably, in step S2, two FPGAs are used to accelerate the YOLOv3-tiny target recognition neural network algorithm, and the image data of the near image and the image data of the far image are processed by using the YOLOv3-tiny algorithm.

The beneficial effect of the present disclosure is to quickly and effectively detect the distance information of a specific target in real time. In addition, the present disclosure has advantages of accuracy and low costs.

DETAILED DESCRIPTION OF THE EMBODIMENTS

The present disclosure is further described below with reference to the accompanying drawings.

Figure 1:
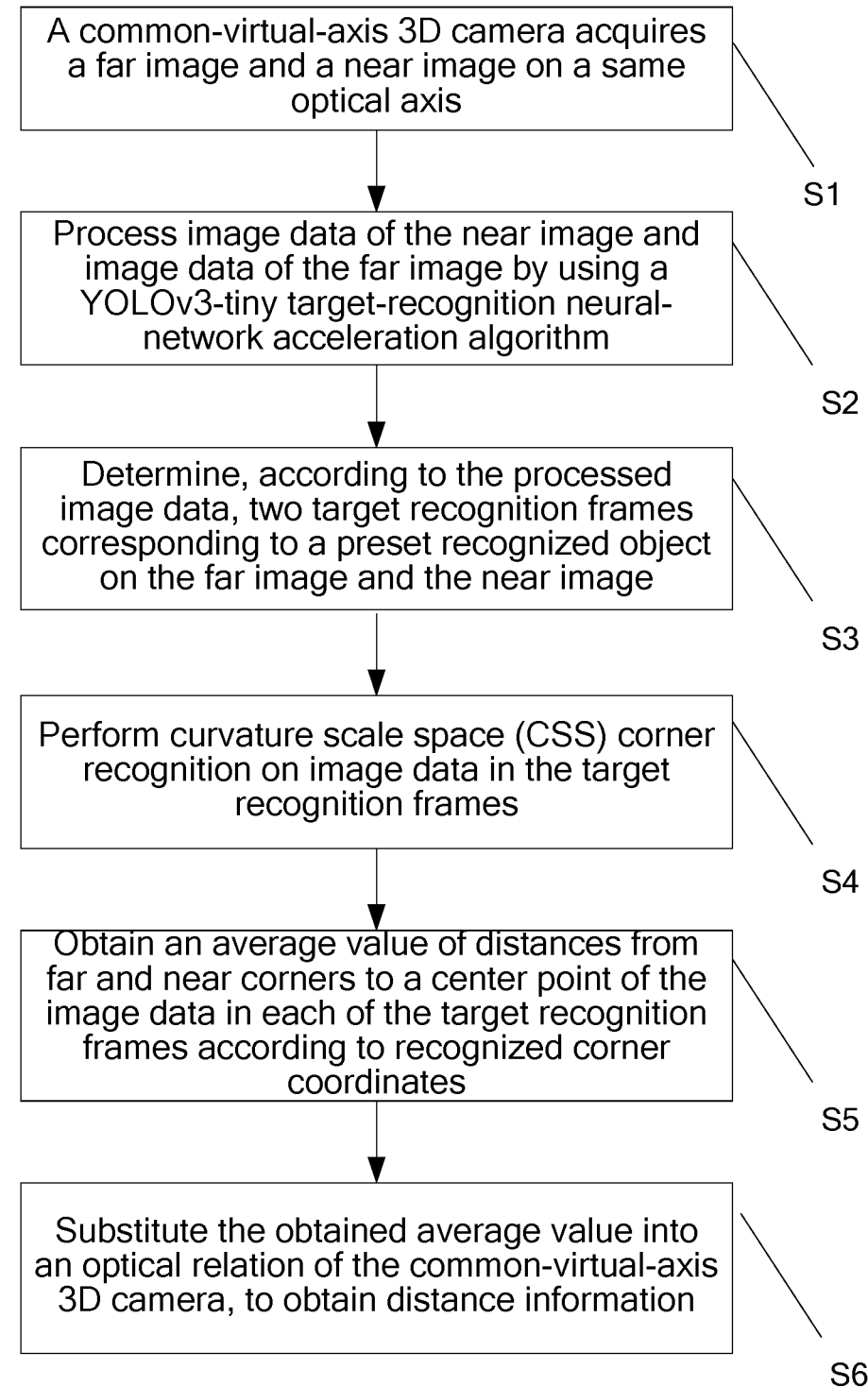
FIG. 1 is a flowchart of a real-time ranging method of a common-virtual-axis 3D camera based on YOLOv3-tiny according to the present disclosure.
Figure 2:
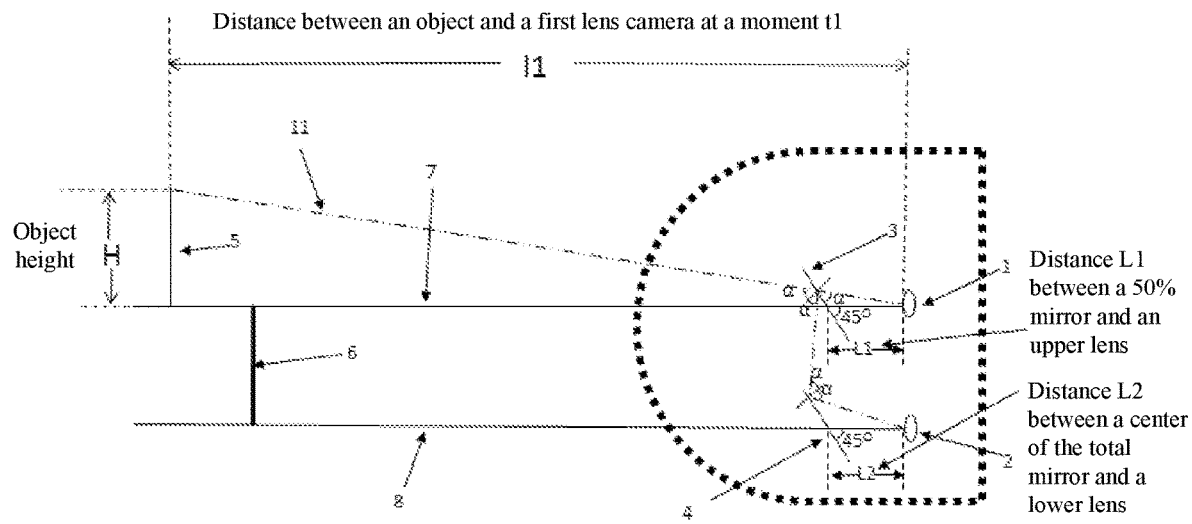
FIG. 2 is a structural diagram of a common-virtual-axis 3D camera according to a specific embodiment of the present disclosure.
Figure 3:
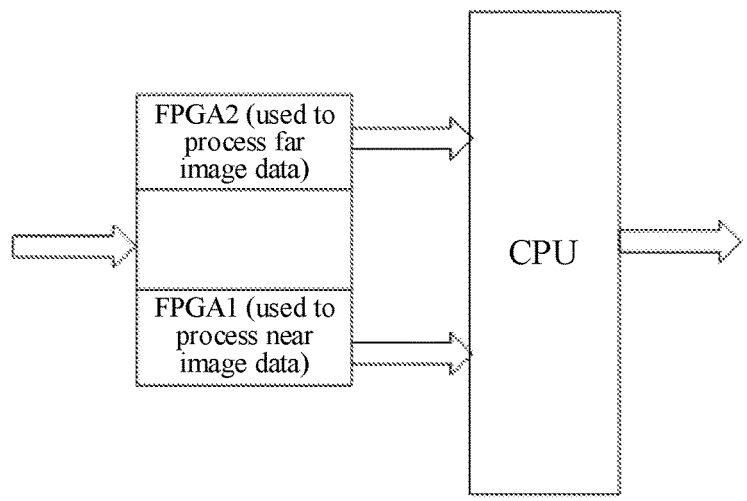
FIG. 3 is a structural diagram of overall deployment of a YOLOv3-tiny target-recognition neural network according to the present disclosure.

With reference to FIG. 1 to FIG. 3, the present disclosure provides a real-time ranging method of a common-virtual-axis 3D camera based on YOLOv3-tiny, including the following steps.

Step S1: The common-virtual-axis 3D camera acquires a far image and a near image on a same optical axis. The parameters of two lenses of the common-virtual-axis 3D camera should be kept consistent as much as possible, and the far image and the near image of a beam of light are acquired at the same time. When the far image and the near image are shot, an electronic system runs a target-recognition neural network of a trained data model. The images are transmitted synchronously.

Step S2: Process image data of the near image and that of the far image by using a YOLOv3-tiny target-recognition neural-network acceleration algorithm. Specifically, two FPGAs are used to accelerate the YOLOv3-tiny target recognition neural network algorithm, and the image data of the near image and the image data of the far image are processed by using the YOLOv3-tiny algorithm. That is, YOLOv3-tiny target-recognition neural-network weight data is obtained first. An acceleration processing is performed on the FPGAs according to the YOLOv3-tiny target-recognition neural-network weight data and an algorithm structure. Then, the image data of the far image and the image data of the near image in the same frame are registered, while a stitching operation is performed. Specifically, step 2 includes:

1) Buffer the image data by using three linebuffers and pack the image data. Specifically, the images first enter from a camera module. Three lines of images are buffered first by using the three linebuffers, and then the data is packed for the first time according to the channel direction. When one linebuffer buffers three pieces of data, nine pieces of data buffered by three linebuffers are packed, that is, the nine pieces of data are packed into one piece of data.

2) Perform first-level operations:
performing a convolution operation and a ReLU operation on the packed image data to obtain a first result;
performing max pooling on the first result to obtain a second result;
obtaining YOLOv3-tiny target-recognition neural-network weight data; and
storing the second result and the obtained YOLOv3-tiny target-recognition neural-network weight data.

3) Repeat the following operations a plurality of times:
obtaining the second result, the YOLOv3-tiny target-recognition neural-network weight data, and pre-stored bias data that are of the previous-level operations, replacing the packed image data in the first-level operations, and executing the first-level operations; and 4) Output the processed image data:
using the second result, obtained in the predetermined two-level operations, as the image data processed in step S3, and outputting the image data. Generally, the output results of the 10th operation and the 13th operation are processed to obtain the target recognition frames.

The convolution, which is performed by using a convolution module, is essentially a multiplication and addition operation. Therefore, the convolution module directly affects the operation efficiency, and how to improve the efficiency of multiplication calculation is quite important. First, 32-bit weight data that is trained by the darknet (a relatively light open-source deep learning framework based entirely on C and CUDA) is quantized in a fixed-point manner by using Caffe-Ristretto (an automatic CNN quantization tool that can compress a 32-bit floating point network), to obtain 16-bit fixed-point weight data.

The convolution operation is performed by using a fixed-point matrix multiplication unit including 16 PE units. Each PE unit includes a fixed-point multiplication calculation unit, a bias addition calculation unit, a ReLU function calculation unit, and a storage unit for storing calculation results. After multiplying the YOLOv3-tiny target-recognition neural-network weight data with the image data, the PE units add the multiplication result with bias data and shift them to output a final result.

The fixed-point multiplication calculation unit splits a large bit width multiplication calculation of 512 bits for the input data into 32 16-bit multiplication calculations, and transmits the results to the bias addition calculation unit after the multiplication calculation. The bias addition calculation unit is formed by 5 layers of adders. The pieces of data are added once first by using the 16 adders, and then the calculation results are continuously added, to obtain the final result.

Generally, for the ReLU function calculation unit, a YOLOv3-tiny network uses the Leaky ReLU as an activation function. However, when x<0, Y=kx, where k is a decimal between 0 and 1, and therefore the floating-point multiplication is required, which not only wastes resources but also consumes a lot of time. To reduce resource consumption and save time, the present disclosure chooses to use the ReLU function as the activation function. The ReLU functions are shown as follows. When x<0, the ReLU function outputs y=0. Compared with the Leaky ReLU, the realization of the ReLU function in the circuit not only saves resources but also saves calculation time.

$$Y = \begin{cases} x, & x \geq 0 \\ kx, & x < 0 \end{cases} \text{ and } Y = \begin{cases} x, & x \geq 0 \\ 0, & x < 0 \end{cases}.$$

Step S3. Determine, according to the processed image data, two target recognition frames corresponding to a preset recognized object on the far image and the near image. The pieces of position information of the center points of the two target recognition frames should overlap in the far image and the near image, and the error should also be within a certain threshold range. This condition is used to match the object in the far image with the object in the near image.

Step S4: Perform curvature scale space (CSS) corner recognition on image data in the target recognition frames. The same limited quantity of corner coordinates on the far image and the near image are outputted respectively.

Step S5: Obtain an average value of distances from far and near corners to a center point of the image data in each of the target recognition frames according to recognized corner coordinates. That is, a one-to-one correspondence between the corners is established, and the average value of the distances from far and near corners to the center point of the image part within the target recognition frame is taken.

step S6: substituting the obtained average value into an optical relation of the common-virtual-axis 3D camera, to obtain distance information. The optical relation of the common-virtual-axis 3D camera is:

$$L'1 = \frac{(L2 - L1 + h)}{1 - \frac{d1}{d2}},$$

where the near image is shot from L1, and the far image is shot from L2; L1 is a distance between a center of a 50% mirror and an upper lens, and L2 is a distance between a center of the total mirror and a lower lens; an average value of corners in a target recognition frame in a first lens is d1, and an average value of corners in a target recognition frame in a second lens is d2; a distance between an optical axis of the first lens and an optical axis of the second lens is h; and a distance between the object and the first lens is L' 1.

In FIG. 2, the serial numbers indicate: a first lens 1; a second lens 2; a beam splitter 3; a total mirror 4; a target object 5; a distance h between an optical axis of the first lens and an optical axis of the second lens 6; the optical axis of the first lens 7; and the optical axis of the second lens 8.

Finally, the distance information may be transmitted to a peripheral device for displaying or the target recognition frames in real time, and the position and distance information can be displayed in real time.

The above embodiments are used only for describing the present disclosure, rather than limiting the present disclosure. Those skilled in the technical field can make various alterations or modifications without departing from the spirit and scope of the present disclosure. Therefore, all equivalent technical solutions should also fall within the protection scope of the present disclosure and should be defined by the claims.

What is claimed is:

1. A real-time ranging method of a common-virtual-axis three-dimensional (3D) camera based on YOLOv3-tiny, comprising:
    step S1: acquiring, by the common-virtual-axis 3D camera, a far image and a near image on a same optical axis;
    step S2: processing image data of the near image and image data of the far image by using a YOLOv3-tiny target-recognition neural-network acceleration algorithm;
    step S3: determining, according to the processed image data, two target recognition frames corresponding to a preset recognized object on the far image and the near image;
    step S4: performing curvature scale space (CSS) corner recognition on image data in the target recognition frames;
    step S5: obtaining an average value of distances from far and near corners to a center point of the image data in each of the target recognition frames according to recognized corner coordinates; and
    step S6: substituting the obtained average value into an optical relation of the common-virtual-axis 3D camera, to obtain distance information.

2. The real-time ranging method of a common-virtual-axis 3D camera based on YOLOv3-tiny according to claim 1, wherein in step S2, YOLOv3-tiny target-recognition neural-network weight data is first obtained, deployment is performed on field programmable gate arrays (FPGAs) according to a characteristic of the YOLOv3-tiny algorithm, and then the image data of the far image and the image data of the near image in a same frame are registered, while a stitching operation is performed.

3. The real-time ranging method of a common-virtual-axis 3D camera based on YOLOv3-tiny according to claim 1, wherein in step S3, pieces of position information of the center points in the two target recognition frames overlap in the far image and the near image.

4. The real-time ranging method of a common-virtual-axis 3D camera based on YOLOv3-tiny according to claim 1, wherein in step S5, a one-to-one correspondence between the corners recognized in the two target recognition frames is established.

5. The real-time ranging method of a common-virtual-axis 3D camera based on YOLOv3-tiny according to claim 1, wherein the optical relation of the common-virtual-axis 3D camera is:

$$L'1 = \frac{(L2 - L1 + h)}{1 - \frac{d1}{d2}},$$

wherein the near image is shot from L1, and the far image is shot from L2; L1 is a distance between a center of a 50% mirror and an upper lens, and L2 is a distance between a center of the total mirror and a lower lens; an average value of corners in a target recognition frame in a first lens is d1, and an average value of corners in a target recognition frame in a second lens is d2; a distance between an optical axis of the first lens and an optical axis of the second lens is h; and a distance between the object and the first lens is L' 1.

6. The real-time ranging method of a common-virtual-axis 3D camera based on YOLOv3-tiny according to claim 2, wherein step S2 comprises:
    buffering the image data by using three linebuffers and packing the image data;
    performing first-level operations:
    performing a convolution operation and a rectified linear unit (ReLU) operation on the packed image data to obtain a first result;
    performing max pooling on the first result to obtain a second result;
    obtaining YOLOv3-tiny target-recognition neural-network weight data; and
    storing the second result and the obtained YOLOv3-tiny target-recognition neural-network weight data;
    repeating the following operations a plurality of times:
    obtaining the second result, the YOLOv3-tiny target-recognition neural-network weight data, and pre-stored bias data that are of the previous-level operations, replacing the packed image data in the first-level operations, and executing the first-level operations; and outputting the processed image data:
using the second result, obtained in the predetermined two-level operations, as the image data processed in step S3, and outputting the image data.

7. The real-time ranging method of a common-virtual-axis 3D camera based on YOLOv3-tiny according to claim 6, wherein the convolution operation is performed by using a fixed-point matrix multiplication unit comprising 16 processing element (PE) units, the PE units accelerate core processing on the FPGAs according to the YOLOv3-tiny target-recognition neural-network weight data and an algorithm structure, the target-recognition neural-network weight data and the image data are multiplied, and a multiplication result and the bias data are added and shifted to output a final result.

8. The real-time ranging method of a common-virtual-axis 3D camera based on YOLOv3-tiny according to claim 1, wherein in step S2, the YOLOv3-tiny target-recognition neural-network algorithm is accelerated by using two FPGAs, and the image data of the near image and the image data of the far image are processed by using the YOLOv3-tiny algorithm.

\* \* \* \* \*